United States Patent
Hanson 4,045,667

Aug. 30, 1977

[54] COLOR-SENSITIVE PHOTOELECTRIC CONTROL SYSTEM WITH FIBER OPTICS

[75] Inventor: Richard J. Hanson, Warren, Ohio

[73] Assignee: General Motors Corporation, Detroit, Mich.

[21] Appl. No.: 690,188

[22] Filed: May 26, 1976

[51] Int. Cl.$^2$ ............................................. G01J 3/34
[52] U.S. Cl. ..................... 250/226; 250/227; 250/229; 340/365 P; 350/96 B
[58] Field of Search ............ 350/96 R, 96 B, 96 WG; 250/226, 227, 229, 199; 340/365 P, 347 P

[56] References Cited
U.S. PATENT DOCUMENTS

| | | | |
|---|---|---|---|
| 2,806,402 | 9/1957 | Ferris | 250/226 |
| 3,886,544 | 5/1975 | Narodny | 340/365 P |

*Primary Examiner*—David C. Nelms
*Attorney, Agent, or Firm*—Warren D. Hill

[57] ABSTRACT

Switching functions such as for windshield wiper control in a vehicle are remotely controlled by a manually positioned optical selector connected through a fiber optic conductor to an electro-optic transceiver. The transceiver provides a light source for illuminating the light conductor and the selector controls the positions of color coated mirrors which are selectively positioned to reflect color coded light via the light conductor to the transceiver which analyzes the modified light spectrum. A logic circuit responsive to the transceiver output controls actuators according to the selected switch function.

3 Claims, 6 Drawing Figures

COLOR-SENSITIVE PHOTOELECTRIC CONTROL SYSTEM WITH FIBER OPTICS

This invention relates to an optical multifunction control system for control of switching functions in a vehicle.

In automotive vehicles, a large number of electrical accessories, some of which have a plurality of functions, tend to create dense and complex electrical wiring assemblies particularly in central control regions. To alleviate that condition and to simplify the wiring arrangement in a vehicle, it is desirable to reduce the number of wires leading to a control station. According to the present invention, several electrical conductors can be replaced by a single fiber optic light conductor and in addition a number of manually controlled electrical switches are replaced by a single optical selector It is therefore an object of the invention to provide in a vehicle an electro-optical control system which is manually controlled by an optical selector at a control location to initiate any of several switching functions without electrical conductors leading to or switches at the control location.

It is a further object of the invention to provide such a system wherein electrical switching functions are carried out at a location in the vehicle remote from the manually operated selector.

The invention is carried out by providing in a vehicle an optical function selector at a control location, a light source and a light receiver remote from the control location for supplying light to and receiving light from the optical selector and providing manually positioned color filter elements in the selector for modifying the spectrum of light sensed by the receiver according to a selected switching function, and a spectral analyzer at the receiver responsive to the filtered light to decode the light spectrum and to control switch functions in accordance with the selected spectrum. The invention also contemplates interconnecting the remote and control components of the system with fiber optic light conductors. In a preferred form the manual selector includes a plurality of mirrors with selective color response to reflect illuminating light to the receiver and simultaneously encode the light according to the desired switching function.

The above and other advantages will be made more apparent from the following specification taken in conjunction with the accompanying drawings wherein like reference numerals refer to like parts and wherein.

Figure 1:
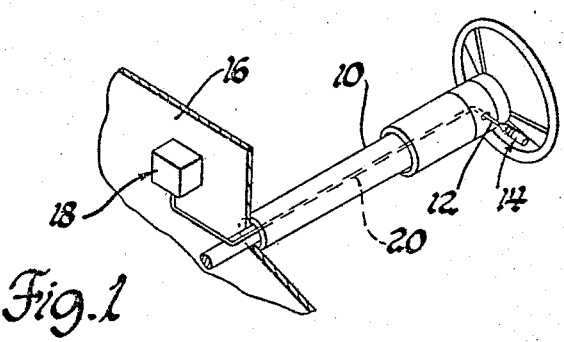
FIG. 1 is a partially broken away view of a vehicle steering column and fire wall equipped with an optical multifunction control system according to the invention.
Figure 2:
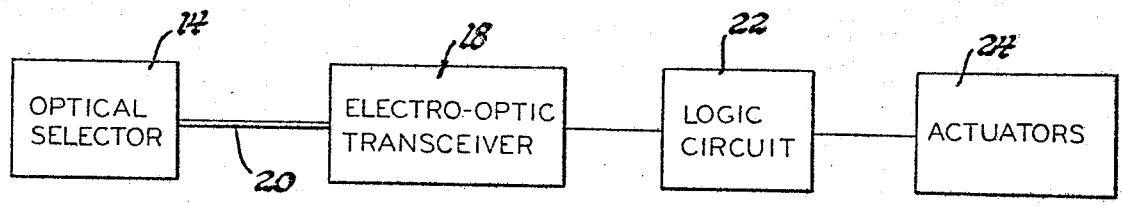
FIG. 2 is a block diagram of the control system of FIG. 1.

As shown in FIG. 1, a vehicle steering column 10 carries a directional signal lever 12 having a selector 14 mounted at the free end thereof. The vehicle fire wall 16 carries an electro-optic transceiver 18 and utilization circuitry. The transceiver 18 and optical selector 14 are interconnected by a fiber optic light conductor 20 routed internally of the steering column. As shown more clearly in FIG. 2, the utilization circuitry associated with the electro-optic transceiver 18 comprises a logic circuit 22 responsive to the output of the transceiver 18 and switch actuators 24 controlled by the circuit 22 for accomplishing the selected switch function. The fiber otpic light conductor 20 comprises a single bundle of optical fibers enclosed in a jacket of the type that is more fully described in the U.S. Pat. No. to Baer 3,425,581 and is effective to carry light both ways between the selector 14 and the transceiver 18.

Figure 3:
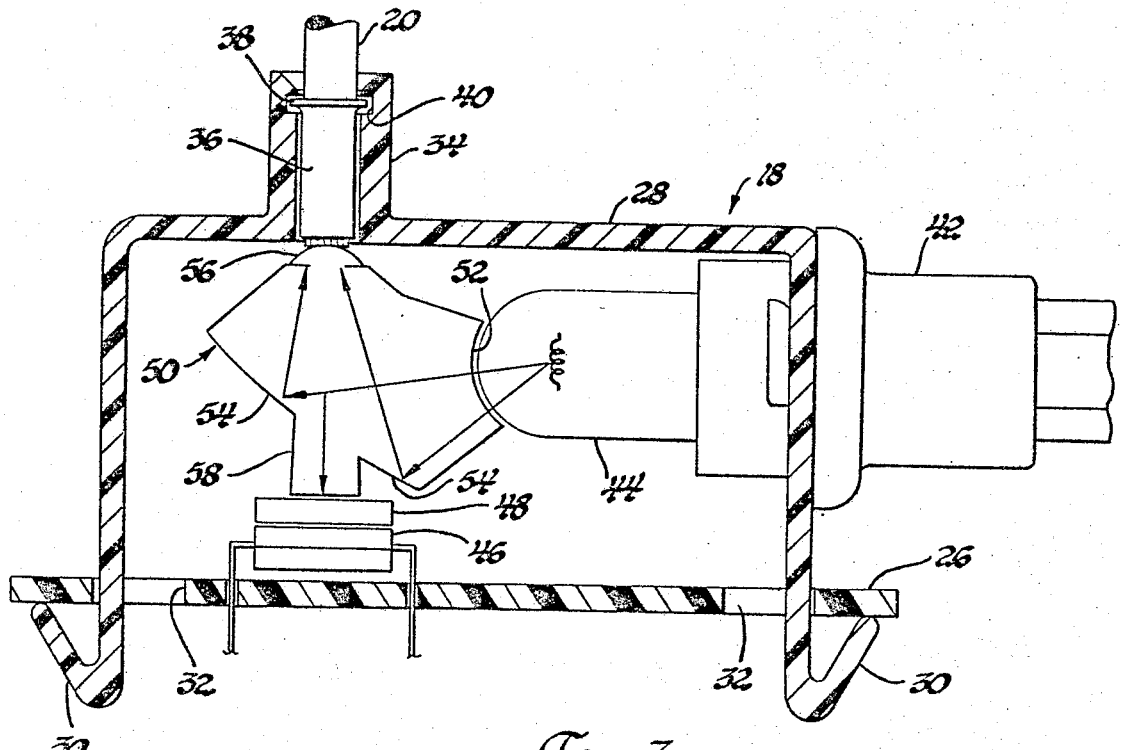
FIG. 3 is a cross-sectional elevational view of the electro-optic transceiver of FIG. 2.

The electro-optic transceiver 18 is shown in FIG. 3 and comprises a molded housing having a flat baseboard 26 with apertures 32 and a hat shaped enclosure portion 28 secured to the baseboard 26 by hook portions 30 extending through apertures 32. One wall of the enclosure 28 includes a cylindrical protrusion 34 which receives one end of the light conductor 20 which is encased in a ferrule 36 having a flange 38 engaged in an internal groove 40 of the portion 34.

A lamp socket 42 extends through an aperture in another wall of the enclosure 28 and supports a lamp 44 within the enclosure. A photodetector array 46 is mounted on the baseboard 26 in a position opposite the fiber optic light conductor 20, and an optical filter assembly 48 is located on the surface of the array 46 facing the light conductor 20. A complex lens and reflector element 50 occupies the space between the lamp 44, the filter assembly 48 and the light conductor 20 and serves to direct light from the lamp 44 into the end of the light conductor 20 and to direct light from the light conductor 20 to the filter assembly 48 and photodetector array 46. The element 50 includes a concave collecting surface 52 adjacent the end of the lamp 44 and a convex reflective surface 54 shaped to focus light from the lamp 44 through an integral convex lens 56 to the light conductor 20. The curved surface 54 is interrupted by a lateral projection 58 extending toward the filter assembly 48 which serves to couple light emitted from the light conductor 20 into the filter assembly. The projection 58 is shaped and located such that light does not pass directly from the lamp 44 to the filter assembly 48.

Figure 4:
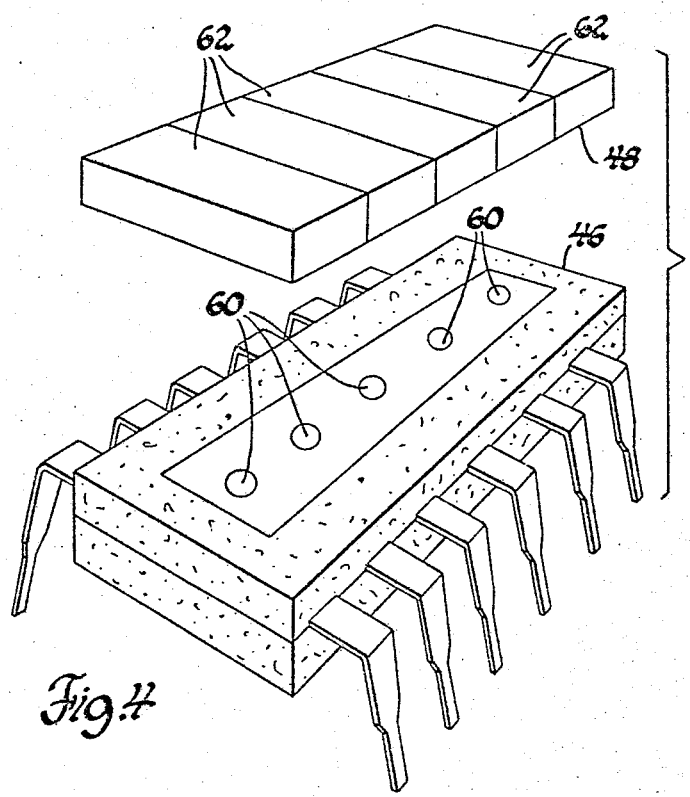
FIG. 4 is an exploded view of a portion of the transceiver of FIG. 3.

As shown in FIG. 4, the photodetector array 46 is an integrated circuit module carrying five photodetector elements 60. The filter assembly 48 includes five segments 62 each passing a spectral band or combination of bands different from the others so that light impinging on the filter assembly 48 selectively energizes photodetector elements 60 depending upon the particular spectrum of the incident light.

Figure 5:
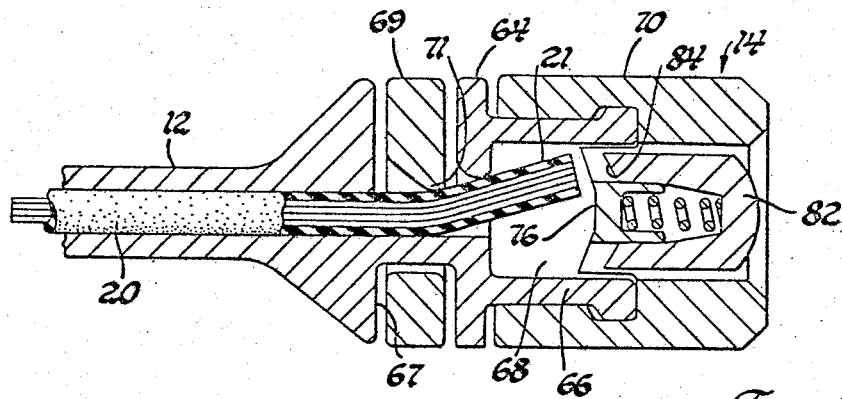
FIG. 5 is an optical selector of the system as shown in FIGS. 1 and 2.
Figure 6:
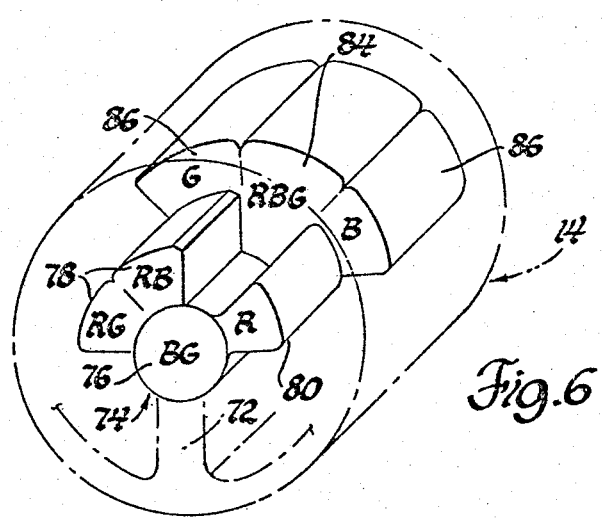
FIG. 6 is a perspective view of a detail of the selector of FIG. 5.

The optical selector 14 shown in FIGS. 5 and 6 is mounted on the end of the directional signal lever 12 which is tubular. The fiber optic conductor 20 extends through the lever 12 into the selector 14. The selector 14 comprises an enlarged portion secured to an integral with the lever 12 and has a stationary support 64 having a central bore to achieve the light conductor 20 and terminates in a cylindrical wall 66 defining a chamber 68 into which the terminal portion 21 of the light conductor 20 extends. The terminal portion 21 is performed to extend toward one side of the chamber 68 or is resiliently biased into that position by means not shown.

The housing stationary support 64 includes an outer annular groove 67 surrounding the central bore and has on one side an open pathway to the bore. An actuator ring 69 located in the groove has an extension 71 in contact with the light conductor 20 so that upon manual movement of the ring 69, the end of the light conductor 20 is moved from its lateral position within the chamber 68 to a central position aligned with the axis of the assembly.

A manually rotatable knob 70 is rotatably mounted on the wall 66 and, as shown in FIG. 6, includes a radially inwardly extending web 72 which carries an array of mirrors 74. The mirrors comprise a central reflecting element 76 and two radially extending reflectros 78 spaced from a third radially extending reflector 80. The outer end of the knob 70 is hollow and supports a push button 82 which is spring biased for linear manual movement axially of the knob 70. The push button 82 carries on its innermost surface at least one reflector 84 which lies between the reflectors 78 and 80 on the knob 70. Two optional reflectors 86 are also carried by the push button 82 and those reflectors 86 lie radially adjacent the reflectors 78 and 80. Normally, the mirrors 84 and 86 lie somewhat outwardly of the location of the reflector array 74, as shown, but are movable into the region of the array 74 upon actuation of the push button 82.

Each of the mirrors is coated with a colored filter material such that each individual reflective surface has a unique spectral band or combination of bands so that by selectively positioning the mirrors relative to the end of the light conductor 20, the light carried into the selector is filtered and reflected back into the light conductor 20 where it is carried to the filter array 48.

As a specific example of a spectral filter arrangement, red, blue and green bands are selected. As shown in FIG. 6, the reflectors are denoted as R, B, G, RB, RG, etc. denoting red, blue and green or combinations of those colors. As indicated in the accompanying table, these colors can be used to relate to accessory switching functions and particularly for windshield wiper/washer and cruise control. These functions are selected for exemplary purposes since they are functions which often are controlled by a mechanism on the directional signal lever.

| R | B | G | |
|---|---|---|---|
| 1 | 0 | 0 | Pulse |
| 0 | 0 | 0 | Off |
| 1 | 1 | 0 | Slow  — Wiper |
| 1 | 0 | 1 | Fast |
| 1 | 1 | 1 | Cruise |
| 0 | 1 | 1 | Wash |

As shown in the table, the wiper has pulse, slow and fast modes as well as off whereas the wash and cruise control function has one mode each, which are sufficient to initiate the wash or cruise control operation, those functions being ordinarily terminated automatically.

The table uses binary logic notation to denote the presence or absence of a color band with one or a zero respectively. When the end of the light conductor is positioned to the side of the chamber 68 as shown in FIG. 5 and the selector is in normal position, the end of the light conductor will be aligned with the space between the reflectors 78 and 80 as seen in FIG. 6 so that no light is reflected back into the light conductor, thereby providing a 000 code which denotes the off mode of the wiper. When the knob 70 is rotated in one direction, the reflector 80 is positioned opposite the light conductor so that only red light is reflected back into the light conductor. As seen in the table, this denotes the pulse mode of the wiper. When the knob 70 is rotated in the other direction from the off position so that either of the reflectors 78 is adjacent the end of the light conductor, either red and blue or red and green codes are selected to indicate slow and fast modes. When the knob is in its normal off position and the cruise control push button 82 is depressed, the reflector 84 is moved to the end of the light conductor and that reflector returns 11 three color bands to provide the 111 or cruise mode indication. To obtain the 011 or wash mode signal, the ring 69 is manually moved to deflect the end of the light conductor 20 to the center of the mirror array aligned with the reflector 76 which carries the blue and green filter. The optional reflectors 86 are shown merely to suggest the availability of other control modes.

When the color coded light signal reaches the transceiver, it is analyzed by the filter assembly 48. The individual filters 62 correspond to the filters at the mirror array so that each filter corresponds to one of the color bands or band combinations at the selector. The photodetector 60 senses light transmitted through any of the filters and the logic circuit 22 is used to decode the signals and control the actuator 24 in a manner consistent with the coded function request. It is apparent that other codes or other decoding arrangement could be used. For example, the code used in the above table could be analyzed with only three filters 62 and photodetectors 60. If red, blue and green filters were used, then the code in the colored light signal could be read to reveal the appropriate function by the logic circuit 22. On the other hand, instead of using the three colors in the mirror array, five distinctive color bands could be used. One corresponding to each desired function other than off and five corresponding filters in the filter assembly 48 then would pass light to just one photodetector 60 for each selected function. Then the operation of the logic circuit would be essentially performed by the transceiver.

An alternative system, not shown in the drawings, would use the same selector arrangement described above but have a different transceiver. There, red, blue and green light emitting diodes would comprise the light source and a simple receiver would be responsive to any light pulse received from the selector. The diodes would then be sequentially flashed and reception of a pulse at the receiver would indicate a color the same as that of the sending LED. The logic circuit then would be required to decode the selected switch function in accordance with the pulses received for each set of LED pulses.

It will thus be seen that with the optical coding arrangement described herein a color code is set by a manually operated selector and only a single fiber optic light conducting bundle is required to communicate information which requires several electrical conductors in a conventional switching arrangement.

The embodiments of the invention in which an exclusive property or privilege is claimed are defined as follows:

1. In a vehicle having a plurality of switching functions manually and remotely controlled at a control location, an optical control system comprising,
   a light source,
   a receiver sensing light from the light source,
   a manually controlled optical selector at the control location intervening between the light source and the receiver for modifying the light spectrum sensed by the receiver, the selector comprising a plurality of different color filter means each effective when selected for modifying the illuminating light to provide a unique light spectrum corresponding to a given switching function, and the receiver including a spectral analyzer responsive to the spectrum of the filtered light, and further including electrical switching means controlled by the analyzer to energize any of a plurality of switching functions corresponding to the selected spectrum, whereby the swtiching functions are controlled by manual selection of the color filter means.

2. In a vehicle having a plurality of switching functions manually controlled at a control location, an optical control system comprising, a transceiver located remotely from the control location including a light source, a fiber optic light conductor extending between the transceiver and the control location and illuminated by the light source, a manually controlled optical selector at the control location having means for modifying the spectrum of the light carried from the source by the light conductor and for returning the modified light through the light conductor to the transceiver, the selector comprising a plurality of different color filter means each effective when selected for modifying the illuminating light to provide a unique light spectrum corresponding to a given switching function, and the transceiver including a spectral analyzer responsive to the spectrum of the filtered light, and further including electrical switching means controlled by the analyzer to energize any of a plurality of switching functions corresponding to the selected spectrum, whereby the switching functions are controlled by manual selection of the color filter means.

3. In a vehicle having a plurality of switching functions manually controlled at a control location, an optical control system comprising a transceiver located remotely from the control location including a light source, a fiber optic light conductor extending between the transceiver and the control location and illuminated by the lignt source, manually controlled optical selector means at the control location comprising a plurality of manually selectable mirrors each effective when selected to return the illuminating light to the transceiver via the light conductor, each mirror being selectively reflective to modify the illuminating light to provide a unique light spectrum corresponding to a given switching function, and the transceiver including a spectral analyzer responsive to the spectrum of the filtered light, and further including electrical switching means controlled by the analyzer to energize any of a plurality of switching functions corresponding to the selected spectrum, whereby the switching functions are controlled by manual selection of the color filter means.

* * * * *

UNITED STATES PATENT AND TRADEMARK OFFICE
CERTIFICATE OF CORRECTION

PATENT NO. : 4,045,667
DATED : August 30, 1977
INVENTOR(S) : Richard J. Hanson

It is certified that error appears in the above-identified patent and that said Letters Patent are hereby corrected as shown below:

Column 2, line 8, "otpic" should read -- optic --;
line 58, "achieve" should read -- receive --;
line 61, "performed" should read -- preformed --.

Column 3, line 9, "reflectros" should read -- reflectors --;
lines 41-47, in the table, fourth column, the bracket should surround -- pulse...fast -- instead of "off...cruise".

Column 4, line 8, "11 should read -- all --.

Signed and Sealed this

Twenty-first Day of February 1978

[SEAL]

Attest:

RUTH C. MASON
*Attesting Officer*

LUTRELLE F. PARKER
*Acting Commissioner of Patents and Trademarks*